US011451383B2

(12) United States Patent
Bush (10) Patent No.: US 11,451,383 B2
(45) Date of Patent: Sep. 20, 2022

(54) COMMUNICATION SYSTEMS AND METHODS

(71) Applicant: General Electric Company, Schenectady, NY (US)

(72) Inventor: Stephen Francis Bush, Latham, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 333 days.

(21) Appl. No.: 16/569,491

(22) Filed: Sep. 12, 2019

(65) Prior Publication Data

US 2021/0083864 A1    Mar. 18, 2021

(51) Int. Cl.
*H04L 9/08*    (2006.01)

(52) U.S. Cl.
CPC ............ *H04L 9/0852* (2013.01); *H04L 9/088* (2013.01); *H04L 9/0819* (2013.01); *H04L 2209/24* (2013.01)

(58) Field of Classification Search
USPC ........ 380/263, 255, 264, 276; 726/2, 21, 36; 713/150, 163, 181
See application file for complete search history.

(56) References Cited

U.S. PATENT DOCUMENTS

| | | | | |
|---|---|---|---|---|
| 5,764,765 A * | 6/1998 | Phoenix | ................ | H04L 9/0858 380/256 |
| 6,748,083 B2 * | 6/2004 | Hughes | .................. | H04B 10/70 380/260 |
| 7,437,081 B2 * | 10/2008 | Mitchell | ................ | H04B 10/70 380/256 |
| 8,855,316 B2 * | 10/2014 | Wiseman | .............. | H04L 9/0855 380/278 |
| 9,960,465 B2 * | 5/2018 | Dudley | ............. | H01M 10/6557 |
| 10,057,058 B2 * | 8/2018 | Murakami | ............ | H04L 9/0858 |

(Continued)

FOREIGN PATENT DOCUMENTS

| CN | 104821874 B | 8/2017 |
|---|---|---|
| CN | 108449146 A | 8/2018 |

OTHER PUBLICATIONS

Kraus et al., "Lower and Upper Bounds on the Secret-Key Rate for Quantum Key Distribution Protocols Using One-Way Classical Communication", Physical review letters, vol. 65, Issue: 08, Sep. 2005.

*Primary Examiner* — Sharif E Ullah
(74) *Attorney, Agent, or Firm* — Armstrong Teasdale LLP (57) ABSTRACT

A communication system is provided that includes a first quantum key distribution device and a communication device. The first quantum key distribution device is configured to be coupled to a second quantum key distribution device over a quantum channel and to generate a quantum key based on a quantum state transmitted along the quantum channel. The communication device is communicatively connected to the first quantum key distribution device within a network. The communication device is configured to receive the quantum key from the first quantum key distribution device and transmit the quantum key to an end device in the network via a classical link to enable the end device to use the quantum key for encrypting and/or decrypting messages communicated through the network.

21 Claims, 3 Drawing Sheets

(56) References Cited

U.S. PATENT DOCUMENTS

| | | | |
|---|---|---|---|
| 2005/0138352 A1* | 6/2005 | Gauvreau | H04L 9/3247 |
| | | | 713/153 |
| 2007/0065154 A1* | 3/2007 | Luo | H04J 14/0246 |
| | | | 398/141 |
| 2007/0076884 A1* | 4/2007 | Wellbrock | H04L 9/0858 |
| | | | 380/263 |
| 2007/0195774 A1* | 8/2007 | Sherman | H04L 69/16 |
| | | | 370/392 |
| 2011/0206204 A1* | 8/2011 | Sychev | H04J 14/0212 |
| | | | 380/256 |
| 2011/0213979 A1* | 9/2011 | Wiseman | H04L 9/0855 |
| | | | 713/171 |
| 2014/0010234 A1* | 1/2014 | Patel | H04L 45/74 |
| | | | 370/392 |
| 2014/0068765 A1* | 3/2014 | Choi | H04L 63/1416 |
| | | | 726/23 |
| 2014/0133652 A1* | 5/2014 | Oshida | H04L 9/0897 |
| | | | 380/255 |
| 2016/0241396 A1* | 8/2016 | Fu | H04L 9/0836 |
| 2016/0359626 A1* | 12/2016 | Fu | H04L 9/0858 |
| 2016/0366094 A1* | 12/2016 | Mason | H04L 61/2038 |
| 2017/0214525 A1* | 7/2017 | Zhao | H04W 12/041 |
| 2017/0230173 A1* | 8/2017 | Choi | H04L 9/0891 |
| 2018/0176091 A1* | 6/2018 | Yoon | H04L 41/0896 |
| 2019/0036821 A1* | 1/2019 | Levy | G06F 12/0868 |
| 2019/0349392 A1* | 11/2019 | Wetterwald | H04J 3/0667 |
| 2020/0084222 A1* | 3/2020 | William | H04L 9/0869 |

\* cited by examiner

| Encryption Key | End Device Assignment | Validity Lifetime |
| --- | --- | --- |
| A | 210 | $1^{st}$ time period |
| B | 210 | $2^{nd}$ time period |
| C | 210 | $3^{rd}$ time period |
| D | 212 | $1^{st}$ time period |
| E | 212 | $2^{nd}$ time period |
| F | 212 | $3^{rd}$ time period |

COMMUNICATION SYSTEMS AND METHODS

GOVERNMENT LICENSE RIGHTS

This invention was made with government support under contract number DE-OE0000894 awarded by the Department of Energy. The government has certain rights in the invention.

FIELD

The subject matter described herein relates to sharing non-publicly available information within computerized communication networks.

BACKGROUND

The IEEE 802.1 Time-Sensitive Networking Task Group has created a series of standards that describe how to implement deterministic, scheduled Ethernet frame delivery within an Ethernet network. Time-sensitive networking benefits from advances in time precision and stability to create efficient, deterministic traffic flows in an Ethernet network. Time-sensitive networks can be used in safety critical environments, such as control systems for automated industrial systems. In these environments, timely and fast control of machinery is needed to ensure that operators and equipment at or near the machinery being controlled are not hurt or damaged. Encryption systems, such as quantum key distribution systems, may be used in these networks to ensure that malevolent actors do not hack into or otherwise interfere with communication through the time-sensitive networks and cause damage or harm.

Quantum key distribution systems include quantum devices connected by a quantum channel. The quantum devices utilize quantum mechanics to produce a shared random secret key that may be known only to the quantum devices. The shared random key is used to encrypt and decrypt messages communicated between the quantum devices. Information can be encoded in quantum states (e.g., qubits) instead of bits, which enables detection of a third-party end device attempting to detect or listen in to the communications using the quantum key. However, devices on the network that do not know the shared random key may not be able to participate in quantum key distribution, so the messages between these devices may be at greater risk for interception or interference by a third-party end device than quantum-key-encrypted messages.

SUMMARY

In one or more embodiments, a communication system is provided that includes a first quantum key distribution device and a switch. The first quantum key distribution device is configured to be coupled to a second quantum key distribution device over a quantum channel and to generate a quantum key based on a quantum state transmitted along the quantum channel. The communication device is communicatively connected to the first quantum key distribution device within a network. The communication device is configured to receive the quantum key from the first quantum key distribution device and transmit the quantum key to an end device in the network via a classical link to enable the end device to use the quantum key for encrypting and/or decrypting messages communicated through the network.

In one or more embodiments, a method for distributing secret information for securing communications is provided. The method includes generating a quantum key using a first quantum key distribution device and a second quantum key distribution device connected to each other by a quantum channel. The quantum key is generated based on a quantum state transmitted along the quantum channel. The method includes receiving the quantum key at a communication device communicatively connected to the first quantum key distribution device within a network. The method also includes transmitting the quantum key from the communication device to an end device in the network via a classical link to enable the end device to use the quantum key for encrypting and/or decrypting messages communicated through the network.

In one or more embodiments, a communication system is provided that includes a first quantum key distribution device, a communication device, and multiple end devices within a network. The first quantum key distribution device is configured to be coupled to a second quantum key distribution device over a quantum channel and to generate a quantum key based on a quantum state transmitted along the quantum channel. The communication device is coupled to the first quantum key distribution device via a classical connection cable. The end devices are connected to the communication device via classical links. The communication device is configured to receive quantum keys from the first quantum key distribution device and to distribute the quantum keys to the end devices via the classical links to enable the end devices to use the quantum keys for encrypting and/or decrypting messages communicated through the network.

BRIEF DESCRIPTION OF THE DRAWINGS

The inventive subject matter will be better understood from reading the following description of non-limiting embodiments, with reference to the attached drawings, wherein below.

DETAILED DESCRIPTION

Reference now will be made in detail to embodiments of the present disclosure, one or more examples of which are illustrated in the drawings. Each example is provided by way of explanation of the present disclosure and is not a limitation of the present disclosure. Features illustrated or described as part of one embodiment can be used with another embodiment to yield a still further embodiment. Thus, it is intended that the present disclosure covers such modifications and variations as come within the scope of the appended claims and their equivalents.

One or more embodiments of the inventive subject matter described herein relate to systems and methods that increase cybersecurity in time-sensitive networking by using different channels to generate non-public information. The different channels can be used to transmit different information and/or information in different ways. For example, one channel may be a quantum channel and another channel may be a classical channel. A combination of quantum and classical channels can be used by the systems described herein to communicate non-public information to intended recipients on a network. The network may be a time-sensitive network or a different type of network. The non-public information may include or represent quantum keys for encrypting and decrypting messages. The quantum keys may be generated according to quantum key distribution.

Quantum key distribution utilizes quantum mechanics by allowing a pair of quantum key distribution devices to produce a shared random secret key referred to herein as a quantum key. For example, the quantum key distribution devices generate the quantum key by communicating a quantum state within a quantum channel between the pair of quantum key distribution devices. The quantum state may be defined by photons of light that are transmitted through one or more optical fibers between the quantum key distribution devices. The optical fibers define a quantum channel, and the quantum key distribution devices are also connected via a classical channel. The classical channel is used to communicate data and information between the quantum key distribution devices to complete the formation of the quantum key.

The generated quantum key can be used to encrypt and/or decrypt messages communicated between end devices integrated with or coupled to the quantum key distribution devices. The end devices may be computing devices, such as computers, sensors, controllers, and the like, that send and receive control signals, data signals, status signals, confirmation signals, and the like. Information can be encoded in quantum states (e.g., qubits) instead of bits, which allows for detection of a third-party end device attempting to detect or listen in to the encrypted communications. The third-party attempt can slightly introduce errors during reception of the shared quantum key by disturbing the quantum state within the quantum channel. The errors can be detected by one or more of the quantum key distribution devices to detect the third-party attempt.

The quantum key may be known only to the quantum key distribution devices and the particular end devices integrated with or coupled to the quantum key distribution devices. For example, a first end device (referred to herein as "Alice") that includes a first quantum key distribution device can securely communicate with a second end device (referred to herein as "Bob") that includes a second quantum key distribution device, via the use of quantum key encryption of the messages over the quantum and classical channels therebetween. But, many pre-existing end devices in networks, such as time-sensitive networks, are not quantum-key enabled. For example, many communication pathways between end devices in a network may be defined by classical channels that do not leverage quantum states. These classical channels are more susceptible to third party eavesdropping and/or tampering than quantum channels. It may be prohibitively expensive and/or difficult to install quantum channels, such as optical fibers, between all of the end devices in a network and to integrate quantum key distribution devices (or circuitry) into all of the end devices in order to take advantage of the increased security provided by quantum key distribution.

In one or more embodiments, a communication system and method are provided for scaling the use of quantum key distribution to devices that are not set up for quantum key distribution. Quantum keys generated between a pair of quantum key distribution devices, such as Alice and Bob, are distributed to one or more additional end devices to enable the additional end devices to securely communicate using the quantum keys. In a non-limiting example, one or more quantum keys generated by Alice and Bob, as primary devices, may be distributed to two additional or secondary end devices, "Cathy" and "Doug", through a classical mechanism (e.g., without the use of photons of light through an optical fiber). The one or more quantum keys can be used to encrypt and decrypt messages communicated between or among any of the devices that have the keys (e.g., Alice, Bob, Cathy, and Doug) while the keys are valid.

Time-sensitive networking provides support for implementing quantum key distribution and for scaling the distribution beyond the pair of quantum key distribution devices that generate the key. For example, precise synchronization and timing are needed on the quantum channel and efficient utilization of the classical channel is required to generate quantum keys at higher and more deterministic rates for use in time-sensitive networking. In one or more embodiments, the quantum keys may be encrypted with one-time pads, such that the keys are valid for the exchange of only one message or one part of a message. The relatively short, deterministic lifetimes of the quantum keys enabled by the time-sensitive network reduces the likelihood of third-party eavesdropping and tampering of the classical channels that connect Alice and Bob to the secondary devices, such as Cathy and Doug.

At least one technical effect of the subject matter described herein provides for increased security in the communication of information in a network, such as packets in a time-sensitive network. This can help ensure the safe and secure communication of information that is communicated in a time critical manner without retrofitting the network to include quantum channels along all communication links or quantum key-generating devices or circuitry at each end device (e.g., end-point). The distribution and use of the quantum keys to encrypt communications among various end devices, including classical (e.g., non-quantum-enabled) devices, protects the communication system from hackers attempting to access the communication system through a cyberattack.

Figure 1:
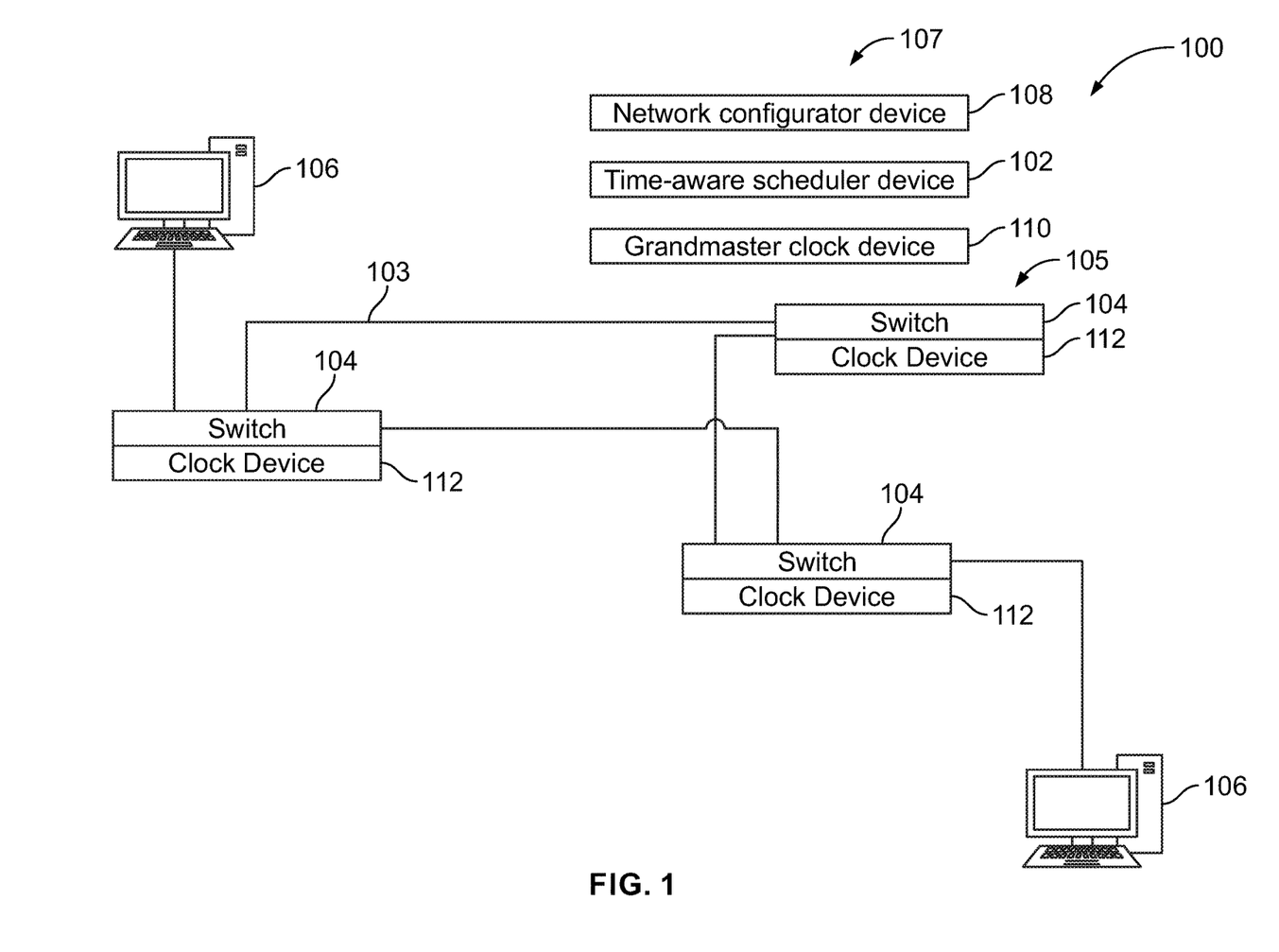
FIG. 1 schematically illustrates a network control system of a time-sensitive network in accordance with embodiments herein.

FIG. 1 schematically illustrates one embodiment of a network control system 107 of a time-sensitive network 100. The components shown in FIG. 1 represent hardware circuitry that includes and/or is connected with one or more processors (e.g., one or more microprocessors, field programmable gate arrays, and/or integrated circuits) that operate to perform the functions described herein. The components of the network 100 can be communicatively coupled with each other by one or more wired and/or wireless connections. Not all connections between the components of the network 100 are shown herein. The network 100 can be a time-sensitive network in that the network 100 is configured to operate according to one or more of the time-sensitive network standards of IEEE, such as the IEEE 802.1AS™-2011 Standard, the IEEE 802.1Q™-2014 Standard, the IEEE 802.1Qbu™-2016 Standard, and/or the IEEE 802.3Br™-2016 Standard. Time-sensitive networks can be used in life-critical industrial control applications, such as the power grid, where cybersecurity is important.

The network 100 includes several nodes (or bridges) 105 formed of network switches 104 and associated clocks 112 ("clock devices" in FIG. 1). While only a few nodes 105 are shown in FIG. 1, the network 100 can be formed of many more nodes 105 distributed over a large geographic area.

The network 100 can be an Ethernet network that communicates data signals along, through, or via communication links 103 between end devices 106 (e.g., computers, control systems, sensors, etc.) through or via the nodes 105. The links 103 can represent one or more of a variety of different communication paths, such as Ethernet links, optical links, copper links, and the like. The data signals are communicated as data packets sent between the nodes 105 on a schedule of the network 100, with the schedule restricting what data signals can be communicated by each of the nodes 105 at different times.

For example, different data signals can be communicated at different repeating scheduled time periods based on traffic classifications of the signals. Some signals are classified as time-critical traffic while other signals are classified as best effort traffic. The time-critical traffic can be data signals that need or are required to be communicated at or within designated periods of time to ensure the safe operation of a powered system. The best effort traffic includes data signals that are not required to ensure the safe operation of the powered system, but that are communicated for other purposes (e.g., monitoring operation of components of the powered system).

The control system 107 includes a time-aware scheduler device 102 that enables each interface of a node 105 to transmit an Ethernet frame (e.g., between nodes 105 from one computer device 106 to another device 106) at a prescheduled time, creating deterministic traffic flows while sharing the same media with legacy, best-effort Ethernet traffic. The time-sensitive network 100 has been developed to support hard, real-time applications where delivery of frames of time-critical traffic must meet tight schedules without causing failure, particularly in life-critical industrial control systems. The scheduler device 102 computes a schedule that is installed at each node 105 in the network 100. This schedule dictates when different types or classification of signals are communicated by the switches 104.

The scheduler device 102 remains synchronized with a grandmaster clock device 110 that includes is a clock to which clock devices 112 of the nodes 105 are synchronized. A centralized network configurator device 108 of the control system 107 is comprised of software and/or hardware that has knowledge of the physical topology of the network 100 as well as desired time-sensitive network traffic flows. The configurator device 108 can be formed from hardware circuitry that is connected with and/or includes one or more processors that determine or otherwise obtain the topology information from the nodes 105 and/or user input. The hardware circuitry and/or processors of the configurator device 108 can be at least partially shared with the hardware circuitry and/or processors of the scheduler device 102.

The topology knowledge of the network 100 can include locations of nodes 105 (e.g., absolute and/or relative locations), which nodes 105 are directly coupled with other nodes 105, etc. The configurator device 108 can provide this information to the scheduler device 102, which uses the topology information to determine the schedules for communication of secret information (e.g., quantum keys and other encryption keys) and messages between the devices 106 (that may be encrypted using the secret information). The configurator device 108 and/or scheduler device 102 can communicate the schedule to the different nodes 105.

A link layer discovery protocol can be used to exchange the data between the configurator device 108 and the scheduler device 102. The scheduler device 102 communicates with the time-aware systems (e.g., the switches 104 with respective clocks 112) through a network management protocol. The time-aware systems implement a control plane element that forwards the commands from the centralized scheduler device 102 to their respective hardware.

Figure 2:
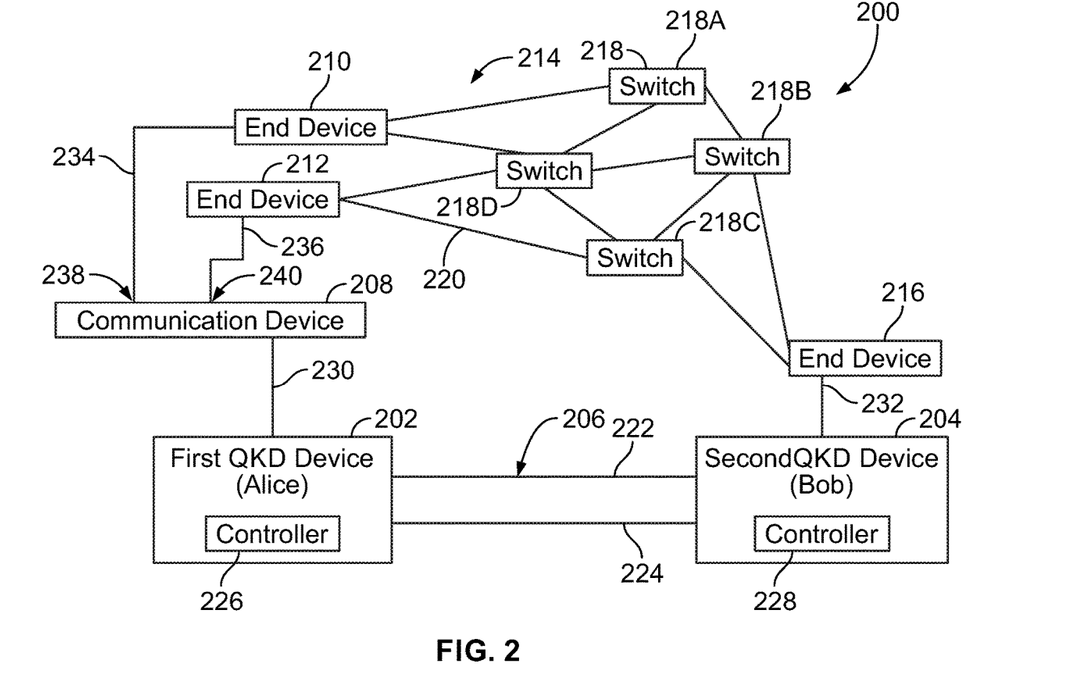
FIG. 2 illustrates a communication system for distributing quantum keys from quantum devices to classical devices in accordance with embodiments herein.

FIG. 2 illustrates a communication system 200 for distributing quantum keys from quantum devices to classical devices according to an embodiment. The quantum devices described herein can include any and all systems and methods that utilize quantum mechanics, including the use of quantum states to transmit key-based information through a quantum channel that may be used to allow two remote devices to securely communicate and share data and information. Example quantum states include photon polarization states, orthogonal states, other conjugate states, entangled based states, or the like. A quantum channel described herein may include any pathway through which quantum states pass to communicate information or data between devices using properties of quantum mechanics. Example quantum channels include pathways through optical fiber, a bundle of optical fiber, or the like.

The classical devices described herein can include devices, communication links (e.g., cables, wires, etc.), components, and the like, that provide or enable communication without utilizing quantum mechanics (e.g., without transmitting quantum states). The classical devices may convey or transmit signals using electrical wires, optical fibers, and/or wireless media. Systems that include such components include, but are not limited to Ethernet, phone line systems, broadband systems, systems using twisted pair cables, systems using coaxial cables, cellular systems, routers, fiber optic systems, Internet-based systems, or the like.

The communication system 200 includes a first QKD device 202 and a second QKD device 204. A quantum cable 206 is coupled to both the first and second QKD devices 202, 204 and provides a communication pathway between the two devices 202, 204. The communication system 200 also includes a communication device 208 communicatively connected to the first QKD device 202. The communication device 208 is also communicatively connected to multiple end devices includes a first end device 210 and a second end device 212 within a network 214. The second QKD device 204 is communicatively connected to a third end device 216. The network 214 includes switches 218 (e.g., 218A, 218B, 218C, 218D) and communication links 220 that interconnect the switches 218 and the end devices 210, 212, 216. The end devices 210, 212, 216, the communication device 208, the switches 218, and the links 220 may be classical devices. The first and second QKD devices 201, 204 and the quantum cable 206 may be quantum devices. The communication device 208 may include or represent one of the switches 218 of the network 214, one of the end devices of the network 214, or the like.

In an embodiment, the network 214 in FIG. 2 may represent the network 100 shown in FIG. 1. For example, the switches 218 may represent the switches 104, the links 220 may represent the links 103, and the end devices 210, 212, 216 may represent the end devices 106. The network 214 may be a time-sensitive network. The communication system 200 may include one or more processors that represent the network configurator device 108 and/or the time-aware scheduler device 102 shown in FIG. 1.

In the illustrated embodiment, the second QKD device 204 and the third end device 216 are within the same network 214 as the first QKD device 202, the first and second end devices 210, 212, and the communication device 208. In an alternative embodiment, the second QKD device 204 and the third end device 216 may be disposed within a different network than the first QKD device 202, the first and second end devices 210, 212, and the communication device 208. For example, the quantum cable 206 may extend between the two discrete networks to communicatively connect the networks. In a power grid application, the two networks may be associated with different substations in a metropolitan or geographic region, such that each network may be a local network (e.g., local area network (LAN)) of a different substation.

The first and second QKD devices 202, 204 are configured to generate quantum keys for network cybersecurity. The QKD devices 202, 204 can use quantum mechanics in the form of photonics to create and share the quantum keys. A quantum key is based on a quantum state transmitted between the devices 202, 204 along the quantum cable 206. The quantum cable 206 may include or define a quantum channel 222 and a classical channel 224. The quantum state (or quantum signal) is conveyed along the quantum channel 222, which may include one or more optical fibers. Alternatively, the quantum channel 222 may be available bandwidth space within the network 200. A third-party eavesdropper can be detected by causing a change to the quantum state. Specifically, when the quantum state is disturbed, an anomaly in the signal is detected. A threshold number of anomalies detected indicates a third party is attempting to gain access to the signal.

In an embodiment, the first QKD device 202, referred to as "Alice", transmits a quantum state (or signal) via a quantum channel within the quantum channel 222 to the second QKD device 204, referred to as "Bob". For example, the first QKD device 202 may include a laser or other photon generating source that emits photons into the quantum channel 222. While in this example the first QKD device 202 transmits the quantum state to the second QKD device 204, alternatively the second QKD device 204 transmits the quantum state and is considered "Alice" while the first QKD device 202 receives the quantum state and is considered "Bob".

The quantum state can be encoded in various ways, including polarization, time-bin encoding, entanglement, and the like. Time-bin encoding implements the superposition of different relative phases onto the same photon. Quantum measurement is implemented by measuring the time of arrival of the photon. The time-sensitive network 200 may provide precise and stable time synchronization for controlling the quantum channel 222 in the network 200.

Then, classical processing may be performed by the QKD devices 202, 204 to refine and extract the key material. This processing can involve the transmission of information between the QKD devices 202, 204 along the classical channel 224, which does not leverage quantum states. The classical channel 224 may include one or more electrically conductive (e.g., metallic) wires or cables, one or more optical fibers, or wireless transmission media. The quantum cable 206 optionally may include both one or more electrical wires (representing the classical channel 224) and one or more optical fibers (representing the quantum channel 222) commonly housed within a cable jacket. In a non-limiting example, the quantum channel 222 and the classical channel 224 may share the same optical fiber. The classical processing may include sifting or extraction of the raw key, quantum bit error rate estimation, key reconciliation, and/or privacy amplification and authentication. Implementing the classical channel 224 in a time-sensitive network 200 ensures robust and deterministic generation of the quantum keys and/or other secret information.

The first QKD device 202 may include a respective controller 226 that has one or more processors. The second QKD device 204 may also include a respective controller 228 with one or more processors. The controllers 226, 228 may be configured to execute programs or protocols to determine how and when the quantum keys are generated. One or both of the controllers 226, 228 may also be configured to detect errors in the quantum signal for determining the presence of an eavesdropper or hacker. Each of the controllers 226, 228 may include a respective quantum transmitter, a quantum receiver, and quantum key circuitry. The quantum transmitter forms and transmits a quantum signal including quantum states sent from the first QKD device 202, for example, and received by the quantum receiver of the second QKD device 204 via the quantum channel 222. In one example, the quantum transmitter is a laser that emits photons that are carried along an optical fiber. The quantum transmitter may form quantum states that include differing polarization states, orthogonal states, other conjugate states, entangled based states, or the like that may be received to provide a quantum key and/or other secret information. The quantum key circuitry may be able to receive and analyze quantum states to form the quantum keys and to determine if an error has occurred.

The first and second QKD devices 202, 204 may be controlled to generate shared, random quantum keys at a designated rate. For example, the QKD devices 202, 204 may continuously generate new quantum keys. The characteristics and parameters of the production of quantum keys, such as the rate at which the keys are produced, may be controlled by the network configurator device 108 (shown in FIG. 1), the scheduler device 102, control signals received from another device, or programmed instructions onboard one or both of the QKD devices 202, 204.

In the illustrated embodiment, the communication device 208 is communicatively connected to the first QKD device 202. In the illustrated embodiment, the communication device 208 is separate and discrete from the QKD device 202 and connected to the QKD device 202 via an electrically conductive pathway, such as a classical connection cable 230. The classical connection cable 230 includes at least one electrically conductive wire, and may be an Ethernet cable, an RS-232 type of cable, a coaxial cable, an unshielded twisted pair cable, or the like. In one or more alternative embodiments, the communication device 208 and the first QKD device 202 are integrated together, such as disposed within a common housing. For example, the first QKD device 202 may be formed on a chip, a storage device, or another electrical device that is conductively coupled to the communication device 208. The end device 216 is communicatively connected to the second QKD device 204 via another classical connection cable 232. Alternatively, the end device 216 may be integrated with the second QKD device 204, such as disposed within a common housing and/or the second QKD device 204 is formed on a chip, storage device, or the like that is conductively coupled to the end device 216. Thus, the current system and methodology may be used on existing quantum key distribution systems in which the QKD devices 202, 204 are standalone devices, or may be manufactured for integration onto the communication device 208, the end device 216, or other classical devices.

The communication device 208 is configured to receive the quantum key or keys generated by the first and second QKD devices 202, 204. The communication device 208 receives the quantum keys from the first QKD device 202 in the illustrated embodiment but may be arranged to receive the quantum keys from the second QKD device 204 in an alternative embodiment. According to one or more embodiments, the communication device 208 is configured to distribute the quantum keys to the end devices 210, 212 to enable the end devices 210, 212 to use the quantum keys for encrypting and/or decrypting messages communicated on the network 214. For example, the communication device 208 may include one or more processors for distributing received quantum keys to the end devices 210, 212 that are connected to the communication device 208 according to programmed or received instructions. The communication device 208 in one or more embodiments may be a serial port switch, an Ethernet switch, or the like.

In the illustrated embodiment, the communication device 208 transmits the quantum keys to the end devices 210, 212 via classical links. The classical links include a first classical link 234 that extends from the communication device 208 to the first end device 210 and a second classical link 236 that extends from the communication device 208 to the second end device 212. The classical links 234, 236 may be cables that each include one or more electrically conductive (e.g., metallic) wires. For example, the cables may be serial cables (e.g., RS-232 cables), USB cables, Ethernet cables, or the like. The classical links 234, 236 may mechanically and electrically connect to corresponding ports of the communication device 208. For example, the first classical link 234 may plug into a first port 238 of the communication device 208, and the second classical link 236 may plug into a second port 240 of the communication device. In a non-limiting example, the communication device 208 is a serial port switch (or switcher), and the classical links 234, 236 are serial cables such as RS-232 cables. In another non-limiting example, the communication device 208 is an Ethernet switch, and the classical links 234, 236 are Ethernet cables. Although only a single classical link 234, 236 is shown connecting the communication device 208 to each of the respective end devices 210, 212, alternatively additional classical links and one or more switches may be disposed along the path from the communication device 208 and the end devices 210, 212 to relay information. The communication device 208 may be similar to the switches 104 shown in FIG. 1.

The communication device 208 may be configured to send device-specific secret information to the end devices 210, 212. For example, the communication device 208 may recognize which end device 210, 212 is connected to each of the ports 238, 240, and may transmit quantum keys assigned to the first end device 210 through the first classical link 234 (without sending those quantum keys through the second classical link 236). Similarly, the communication device 208 may transmit quantum keys assigned to the second end device 212 through the second classical link 236 (without sending those quantum keys through the first classical link 234). In an example, the communication device 208 transmits a first quantum key to the first end device 210 to enable the first end device 210 to encrypt and decrypt messages using the first quantum key. The communication device 208 transmits a different, second quantum key to the second end device 212 to enable the second end device 212 to encrypt and decrypt messages using the second quantum key.

In a first alternative embodiment, the communication device 208 transmits both the first and second quantum keys to both end devices 210, 212 with information that assigns each of the keys to a particular end device 210, 212. In a second alternative embodiment, the communication device 208 may transmit a single quantum key to both end devices 210, 212 and the end devices 210, 212 utilize the same key. Although the communication device 208 is connected to two end devices 210, 212 in FIG. 2, the communication device 208 may be connected to a different number of end devices. For example, the communication device 208 may be connected, as described above, to three or more end devices or to only a single end device.

The end devices 210, 212 may utilize the quantum keys received from the communication device 208 for participating in secured communications through the network 214. For example, the end devices 210, 212, 216 communicate frames of messages with each other through the network 214 on a schedule dictated by the scheduler device 102 (shown in FIG. 1). The frames are sent as data packets along one or more paths defined by the combination of the links 220 and the switches 218. In an alternative embodiment, the end devices 210, 212, 216 in the network 214 are communicatively connected to each other through a wireless protocol, which may include a cellular connection, or a wireless connection through an intervening hardware device such as a router, server, or the like.

In an example in which the first end device 210 communicates a message to the third end device 216, the first end device 210 may utilize an appropriate quantum key to encrypt the message. The appropriate quantum key is a key that is assigned to be used by the end device 210 and is valid at the time period in which the message is sent. The quantum key may encrypt multiple frames of the message. Alternatively, different quantum keys may be used to encrypt different frames of the same message. The quantum keys are shared between the QKD devices 202, 204 along the quantum cable 206 so the third end device 216 has access to the quantum keys via the second QKD device 204. The encrypted frames are sent from the end device 210 along one or more paths through the network 214 to the third end device 216. Some or all of the encrypted frames may be transmitted, for example, through the switches of the switches 218D and 218C and the links 220 that connect the devices 210, 216 and the switches 218D, 218C. Optionally, other encrypted frames may be transmitted along a different path to the end device 216, such as through the switch 218A and/or the switch 218B. The third end device 216 receives and decrypts the frames using the quantum keys received by the second QKD device 204. The encrypted message between the end devices 210, 216 may be a time-critical message. For example, the frames of the time-critical message may be deterministically communicated between the devices 210, 216 and the corresponding switches 218 within precisely-controlled time windows or periods scheduled by the scheduler device 102. Similar processes may be performed to encrypt messages communicated between other end devices, such as between the first end device 210 and the second end device 212

The end devices 210, 212 shown in FIG. 2 are not quantum-enabled devices, such that the devices 210, 212 are not integrated with or directly connected to any QKD device or quantum channel. For example, the end devices 210, 212 are classical devices, and the classical communication device 208 is disposed between the devices 210, 212 and the QKD device 202. By distributing the quantum keys to the end devices 210, 212 via the communication device 208 along the classical links 234, 236, cybersecurity provided by quantum key distribution can be extended to additional devices. For example, quantum key encryption can be used to protect messages communicated to and from the end devices 210, 212. The communication system 200 described herein can be used to scale up quantum key distribution in networks without requiring additional quantum hardware (e.g., quantum channels, photon transmitters and receivers, etc.) or quantum circuitry.

The communication device 208 may be configured to distribute the quantum keys to the various connected end devices 210, 212 using one or more distribution mechanisms, algorithms, and/or systems. At least one distribution mechanism may include multicasting. The communication device 208 may generate a multicast message that contains key information and may transmit the multicast message to each of the end devices 210, 212.

Figure 3:
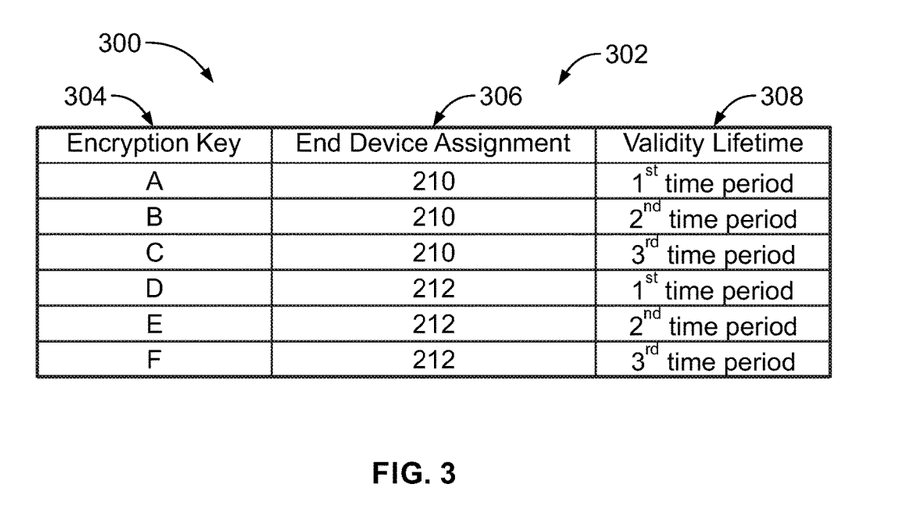
FIG. 3 is a table that represents key information that may be included in a multicast message in accordance with embodiments herein.

FIG. 3 is a table 300 that represents key information 302 that may be included in a multicast message that is transmitted to multiple end devices. The key information 302 may include multiple encryption keys 304 which are received from the QKD device 202 Alice. The key information 302 has additional information associated with each encryption key 304, including a device assignment 306 and a validity lifetime 308 for the respective encryption keys 304. In an embodiment, the encryption keys 304 represent a series of quantum keys generated by the first and second QKD devices 202, 204. One or more processors assigns the encryption keys 304 to different end devices and to have different validity lifetimes. The device assignments 306 represent which device (e.g., end device, switch, etc.) is assigned to utilize each respective encryption key 304. In the illustrated embodiment, the only devices listed in the device assignment column 306 are the first and second end devices 210, 212. The validity lifetimes 308 represent specific time periods at which the encryption keys 304 are considered valid. The encryption keys 304 may only be utilized to encrypt and/or decrypt messages during the respective validity lifetime.

In the illustrated embodiment, the encryption key "A" is assigned to the first end device 210 ("210" in the table 300) and is valid during a first time period. The encryption key "B" is also assigned to the first end device 210 and is valid during a second time period that is subsequent to the first time period. The encryption key "C" is also assigned to the first end device 210 and is valid during a third time period that is subsequent to the second time period. The encryption keys "D", "E", and "F" are assigned to the second end device 212 ("212" in the table 300) and are valid during the first, second, and third time periods, respectively. The information described in the table 300 may represent different portions or segments of the data within the multicast message. For example, the device assignments may be located in a first or header segment, and the encryption keys may be located in a second segment of the message. The multicast message may include additional key information and/or different key information than the information shown in the table 300. For example, the multicast message may include more than six encryption keys that are assigned to more than two end devices and/or have more than three validity time periods.

Referring now back to FIG. 2, in an embodiment the key assigned to a message "sender" must match or correspond to the key assigned to a message "receiver" to enable successful communication between the sender and receiver devices. For example, the third end device 216 may also receive key information that assigns the encryption key "A" to the end device 216 during the first time period. The end device 216 may receive the encryption keys from the QKD device 204 Bob. Therefore, both the first end device 210 and the third end device 216 are assigned matching encryption keys during the same time period, so these two devices 210, 216 can communicate messages to each other during the first time period using the matching keys. Optionally, the third end device 216 may be assigned the encryption key "E" during the second time period, which enables communication with the second end device 212 during the second time period due to the use of the matching encryption key "E" by these two devices 212, 216.

The communication device 208 may generate the multicast message based on the quantum keys received from the first QKD device 202 and scheduling information received from the network configurator device 108 and/or the scheduler device 102 (both shown in FIG. 1). The communication device 208 transmits the multicast message along both of the classical links 234, 236 to the end devices 210, 212. One or more processors within each of the end devices 210, 212 may be configured to analyze the contents of the multicast information. For example, the first end device 212 may identify the encryption keys A, B, C that are assigned to the first end device 212 and may store the encryption keys A, B, C and respective validity lifetimes in a storage medium of the end device 212. Therefore, if the first end device 212 receives a quantum-key-encrypted message during the second time period, the end device 212 utilizes the encryption key B from the multicast message to decrypt the message.

The validity lifetimes of the quantum keys may be tightly controlled using the time-sensitive networking for security purposes. Classical devices such as the communication device 208, the end devices 210, 212, and the classical links 234, 236 may be more susceptible to tampering and hacking than quantum devices. To reduce the risk of a third-party eavesdropper accessing the quantum keys and using the keys to decrypt messages, the quantum keys may be configured for one-time usage only (e.g., one-time pads). For example, the time periods defined in the validity lifetimes may be designated based on an end-to-end latency through the time-sensitive network 214, which is known to the configurator device 108. Each validity lifetime may be only slightly longer in duration than the end-to-end latency to ensure that the quantum keys are used for encrypting only one message or only a fraction of a message (e.g., one or more frames or packets of the message). One or more processors of the configurator device 108 may be configured to instruct the QKD devices 202, 204 to generate new quantum keys at least once for each message that is communicated through the network 214. Therefore, even if an eavesdropper is able to access a quantum key while the key is transmitted to one or both devices 210, 212, that quantum key may be invalid before the eavesdropper is able to utilize that quantum key to decrypt any messages. Furthermore, the quantum keys distributed over classical channels may be encrypted via at least an Advanced Encryption Standard 256-bit (AES-256) key to provide an additional layer of security. In at least one embodiment, all keys distributed over a classical channel must themselves be encrypted via at least an AES-256 key. The AES-256 key may include or represent a one-time pad. The one-time pad is an encryption technique that may not be cracked and requires the use of a one-time pre-shared key the same size as, or longer than, the message being sent.

In an embodiment, the distribution of the quantum keys to the end devices 210, 212 is controlled according to the designated validity lifetimes of the quantum keys. For example, the communication device 208 may transmit a first quantum key such that the first quantum key arrives at the assigned end device at the scheduled start time of the validity lifetime for that first quantum key. Similarly, the end device receives a new quantum key to replace the previous one at the scheduled end time of the previous quantum key. Therefore, the assigned end device receives the quantum keys as the quantum keys become valid, so the end device may not need to wait before using the quantum keys. The scheduled paths of the time-sensitive network 214 can be used to precisely control the time at which the first quantum key arrives at the assigned end device. Optionally, the quantum keys may be communicated to arrive at the assigned end device just prior to the scheduled validity lifetime, such as 30 milliseconds (ms), 50 ms, or the like before the start time, to account for processing lag times at the end device.

The multicast message containing the quantum keys may be communicated to the end devices 210, 212 using various standards and/or protocols. In a non-limiting example, a YANG management system generates and/or transmits the multicast message. The YANG management system represents a standard or protocol and may be located within the communication device 208 and/or the network configurator device 108 that is communicatively connected to the communication device 208. The YANG standard is described in YANG Date Model for Key Chains, Lindem, et al., Internet Engineering Task Force (IETF) Request for Comments: 8177, ISSN: 2070-1721, June 2017, which is incorporated by reference herein. The key information that includes the various encryption keys, assigned devices, and validity lifetimes may be essentially "wrapped" into another key to define a YANG key chain or key set. The other key that wraps the key information may be pre-shared with the recipient end devices 210, 212 and used by the end devices 210, 212 to access the key information. The other, pre-shared key may be a quantum-resistant AES 256 key. In another non-limiting example, a Group Domain of Interpretation (GDOI) standard or protocol is used to generate and/or transmit the multicast message. The GDOI standard is described in Group Domain of Interpretation (GDOI) GROUPKEY-PUSH Acknowledgement Message, Weis, et al., Internet Engineering Task Force (IETF) Request for Comments: 8263, ISSN: 2070-1721, November 2017, which is incorporated by reference herein.

In an alternative embodiment, instead of multicasting a set of multiple keys to the end devices 210, 212, the communication device 208 distributes quantum keys only to the assigned devices. For example, the communication device 208 may be a serial port switch with a switcher that sequentially transmits quantum keys received from the QKD device 202 to the end devices 210, 212. For example, the switch 208 may transmit a first received quantum key to the first end device 210 via the classical link 234, a second received quantum key to the second end device 212 via the classical link 236, a third received quantum key to the first end device 210, a fourth received quantum key to the second end device 212, and so on in a repeating sequence or pattern.

In an embodiment, one key out of a designated group or during a designated time period may be set aside and used for authentication purposes to authenticate the end devices 210, 212 prior to transmitting a series of quantum keys to each one. For example, every $n^{th}$ quantum key generated by the QKD devices 202, 204 may be designated as an authentication key and reserved by Alice and Bob 202, 204 for later authentication purposes. Each device that receives quantum keys (e.g., end devices 210, 212, and 216) may similarly reserve an extra authentication key for authentication purposes. The authentication keys may be used by each device to ensure the identity of another device prior to communication with that other device. Optionally, the authentication keys may be utilized only during an initiation stage when a new device is being set up to receive the quantum keys, or the authentication keys may be utilized prior to every single message that is communicated between two devices.

Optionally, the communication system 200 shown in FIG. 2 may be modified to include another communication device (similar to the communication device 208) disposed between the second QKD device 204 and the third end device 216. That communication device may be communicatively connected to the third end device 216 and optionally one or more additional end devices via classical links. The communication device may receive the quantum keys from the second QKD device 204 and transmit the quantum keys to the connected end devices to enable additional scaling of the quantum key distribution system.

Figure 4:
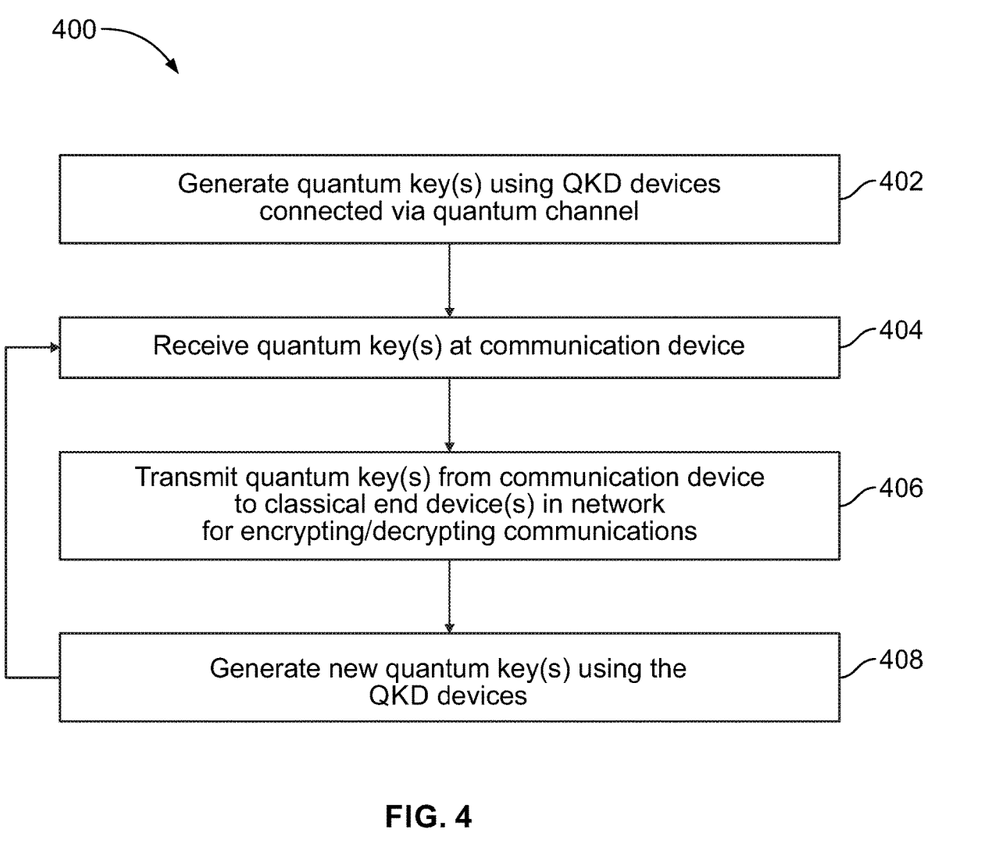
FIG. 4 is a flow chart of a method for distributing secret information for securing communications in accordance with embodiments herein.

FIG. 4 is a flow chart of a method 400 for distributing secret information (e.g., quantum keys) for securing communications according to an embodiment. In one embodiment, the communication system 200 of FIG. 2 may be used to perform the method 400. The method 400 may scale up quantum key distribution communication security by distributing quantum-generated keys to classical devices. At 402, quantum keys are generated using a first QKD device and a second QKD device connected to each other by a quantum channel. The quantum keys are generated based on quantum states transmitted along the quantum channel. For example, the quantum states may be defined by one or more photons emitted into an optical fiber that defines the quantum channel. The photons may be emitted by the first QKD device, the second QKD device, or both.

At 404, the quantum keys are received at a communication device that is communicatively connected to the first QKD device within a network. At 406, the quantum keys are transmitted from the communication device to one or more classical end devices in the network via one or more classical links. For example, the quantum keys may be transmitted to a first end device via a first classical link and to a second end device via a second classical link. The classical links may be serial cables, such as RS-232 cables, or Ethernet cables that are connected to corresponding ports of the communication device. The first and second end devices are configured to use the quantum keys for encrypting and/or decrypting messages communicated through the network. For example, the first end device may use a first quantum key of the quantum keys, and the second end device may use a different, second quantum key of the quantum keys. In a first non-limiting example, the quantum keys may be transmitted by multicasting key information to both the first and second end devices via the first and second classical links. The key information may include the first and second quantum keys, a device assignment for each of the first and second quantum keys, and a validity lifetime for each of the first and second quantum keys. In a second non-limiting example, the communication device is a serial port switch, such that the first quantum key is transmitted to only the first end device and the second quantum key is transmitted to only the second end device via the discrete classical links.

At 408, new quantum keys are generated by the first and second QKD devices. For example, the QKD devices may be controlled to generate, and the communication device is controlled to distribute, at least one new quantum key to be used for encrypting each message that is communicated through the network to and/or from the end devices connected to the communication device. For example, multiple quantum keys may be used to encrypt different packets or frames of a single message communicated through the network. The quantum keys may be generated and used in the network at a relatively high frequency to reduce the risk of eavesdropping or tampering along the classical communication pathways.

The embodiments described herein provide a communication system that extends the use of quantum keys beyond quantum-key-enabled devices for use by classical devices in a network, such as a time-sensitive network. For example, the communication system may, in effect, couple the time-sensitive network Qbv schedule with a quantum key distribution pattern. The quantum key distribution pattern may be a key cycle aligned with the time-sensitive network Qbv cycle time, and the quantum keys may be aligned with the Qbv gate open times. Coupling the quantum keys with the time-sensitive network provides scheduling and tracking support to ensure that all devices are utilizing the correct keys.

In one or more embodiments, a communication system is provided that includes a first quantum key distribution device and a switch. The first quantum key distribution device is configured to be coupled to a second quantum key distribution device over a quantum channel and to generate a quantum key based on a quantum state transmitted along the quantum channel. The communication device is communicatively connected to the first quantum key distribution device within a network. The communication device is configured to receive the quantum key from the first quantum key distribution device and transmit the quantum key to an end device in the network via a classical link to enable the end device to use the quantum key for encrypting and/or decrypting messages communicated through the network.

Optionally, the classical link includes at least one electrically conductive wire, and the quantum channel includes at least one optical fiber.

Optionally, the communication device is a serial port switch, and the classical link is an RS-232 cable that extends from a port on the serial port switch to the end device.

Optionally, the classical link is an Ethernet cable that extends from a port on the communication device to the end device.

Optionally, the network is a time-sensitive network, and the end device is configured to use the quantum key for encrypting and/or decrypting time-critical messages communicated through the time-sensitive network.

Optionally, the first quantum key distribution device and the communication device are disposed within a common housing.

Optionally, the communication device is coupled to the first quantum key distribution device via a classical connection cable that includes at least one electrically conductive wire.

Optionally, the communication device is configured to receive a scheduled validity lifetime for the quantum key and to transmit the quantum key via the classical link such that the end device receives the quantum key at a start of the scheduled validity lifetime.

Optionally, the communication system also includes one or more processors configured to instruct the first and second quantum key distribution devices to generate a new quantum key at least once for each message that is communicated through the network to or from the end device.

Optionally, the end device is a first end device, the classical link is a first classical link, and the quantum key is a first quantum key. The communication device is configured to transmit a second quantum key generated by the first and second quantum key distribution devices to a second end device in the network via a second classical link to enable the second end device to use the second quantum key for encrypting and/or decrypting messages communicated through the network.

Optionally, the communication device is configured to multicast key information to both the first and second end devices via the first and second classical links. The key information includes the first and second quantum keys, a device assignment for each of the first and second quantum keys, and a validity lifetime for each of the first and second quantum keys.

Optionally, the communication device is a serial port switch that transmits the first quantum key to the first end device via a first serial cable that extends from the serial port switch to the first end device, and transmits the second quantum key to the second end device via a second serial cable that extends from the serial port switch to the second end device.

Optionally, the network that includes the first quantum key distribution device, the communication device, the first end device, and the second end device is a first area network. The communication system also includes a second area network including the second quantum key distribution device and a third end device communicatively connected to the second quantum key distribution device. The first and second end devices in the first area network are configured to use the first and second quantum keys, respectively, for encrypting and/or decrypting messages exchanged with the third end device in the second area network.

Optionally, the quantum key is a first quantum key, and the first quantum key distribution device is configured to generate a second quantum key that is designated as an authentication key and is not communicated to the communication device.

In one or more embodiments, a method is provided that includes generating a quantum key using a first quantum key distribution device and a second quantum key distribution device connected to each other by a quantum channel. The quantum key is generated based on a quantum state transmitted along the quantum channel. The method includes receiving the quantum key at a communication device communicatively connected to the first quantum key distribution device within a network. The method also includes transmitting the quantum key from the communication device to an end device in the network via a classical link to enable the end device to use the quantum key for encrypting and/or decrypting messages communicated through the network.

Optionally, the classical link is one of an RS-232 cable or an Ethernet cable connected to a corresponding port of the communication device.

Optionally, the method also includes instructing the first and second quantum key distribution devices to generate a new quantum key at least once for each message that is communicated through the network to or from the end device.

Optionally, generating the quantum key includes emitting one or more photons that define the quantum state into an optical fiber that defines the quantum channel.

Optionally, the end device is a first end device, the classical link is a first classical link, and the quantum key is a first quantum key. The method also includes transmitting a second quantum key from the communication device to a second end device in the network via a second classical link to enable the second end device to use the second quantum key for encrypting and/or decrypting messages communicated through the network.

Optionally, transmitting the first and second quantum keys includes multicasting key information to both the first and second end devices via the first and second classical links. The key information includes the first and second quantum keys, a device assignment for each of the first and second quantum keys, and a validity lifetime for each of the first and second quantum keys.

Optionally, the communication device is a serial port switch and the first quantum key is transmitted to the first end device via a first serial cable that extends from the serial port switch to the first end device. The second quantum key is transmitted to the second end device via a second serial cable that extends from the serial port switch to the second end device.

In one or more embodiments, a communication system is provided that includes a first quantum key distribution device, a communication device, and multiple end devices within a network. The first quantum key distribution device is configured to be coupled to a second quantum key distribution device over a quantum channel and to generate a quantum key based on a quantum state transmitted along the quantum channel. The communication device is coupled to the first quantum key distribution device via a classical connection cable. The end devices are connected to the communication device via classical links. The communication device is configured to receive quantum keys from the first quantum key distribution device and to distribute the quantum keys to the end devices via the classical links to enable the end devices to use the quantum keys for encrypting and/or decrypting messages communicated through the network.

While the present disclosure has been described in terms of one or more particular embodiments, it is apparent that other forms could be adopted by one skilled in the art. It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A communication system comprising:
a first quantum key distribution device coupled to a second quantum key distribution device over a quantum channel and to generate multiple quantum keys, each of the quantum keys generated based on one or more quantum states transmitted along the quantum channel; and
a communication device communicatively connected to the first quantum key distribution device and communicatively connected to multiple end devices within a network via classical links, wherein the communication device receives the quantum keys from the first quantum key distribution device and distributes the quantum keys to the end devices in the network via the classical links to enable the end devices to use the quantum keys for at least one of encrypting or decrypting messages communicated through the network,
wherein the communication device distributes the quantum keys to the end devices by multicasting key information, the key information comprising the quantum keys and at least one of a device assignment for each of the quantum keys or a validity lifetime for each of the quantum keys.

2. The communication system of claim 1, wherein each of the classical links includes at least one electrically conductive wire, and the quantum channel includes at least one optical fiber.

3. The communication system of claim 1, wherein the communication device is a serial port switch and at least one of the classical links is an RS-232 cable that extends from a portion the serial port switch to a corresponding one of the end devices.

4. The communication system of claim 1, wherein at least one of the classical links is an Ethernet cable that extends from a port on the communication device to a corresponding one of the end devices.

5. The communication system of claim 1, wherein the network is a time-sensitive network, and the end devices use the quantum keys for at least one of encrypting or decrypting time-critical messages communicated through the time-sensitive network.

6. The communication system of claim 1, wherein the key information includes the validity lifetime for each of the quantum keys, and the communication device transmits the quantum keys via the classical links such that the end devices receive the quantum keys at a start of the respective validity lifetime.

7. The communication system of claim 1, wherein the first quantum key distribution device and the communication device are disposed within a common housing.

8. The communication system of claim 1, wherein the communication device is coupled to the first quantum key distribution device via a classical connection cable that includes at least one electrically conductive wire.

9. The communication system of claim 1, further comprising one or more processors that instruct the first and second quantum key distribution devices to generate a new quantum key at least once for a message that is communicated through the network to or from one of the end devices.

10. The communication system of claim 1, wherein the end devices include a first end device connected to the communication device via a first classical link of the classical links, and a second end device connected to the communication device via a second classical link of the classical links,
wherein the communication device transmits a first quantum key of the quantum keys generated by the first and second quantum key distribution devices to the first end device via the first classical link and a second quantum key of the quantum keys to the second end device in the network via the second classical link.

11. The communication system of claim 10, wherein the communication device is a serial port switch that transmits the first quantum key to the first end device via a first serial cable that extends from the serial port switch to the first end device and transmits the second quantum key to the second end device via a second serial cable that extends from the serial port switch to the second end device.

12. The communication system of claim 10, wherein the second quantum key distribution device is communicatively connected to a third end device of the end devices and the first and second end devices use the first and second quantum keys, respectively, for at least one of encrypting or decrypting messages exchanged with the third end device through the network.

13. The communication system of claim 1, wherein the first quantum key distribution device generates an authentication key, the authentication key being a quantum key that is not communicated to the communication device.

14. A method comprising:
generating multiple quantum keys using a first quantum key distribution device and a second quantum key distribution device connected to each other by a quantum channel, wherein the quantum keys are generated based on one or more quantum states transmitted along the quantum channel;
receiving the quantum keys at a communication device communicatively connected to the first quantum key distribution device within a network; and
transmitting the quantum keys from the communication device to multiple end devices in the network via classical links for at least one of encrypting or decrypting messages communicated through the network, wherein the transmitting of the quantum keys to the end devices includes multicasting key information, the key information comprising the quantum keys and at least one of a device assignment for each of the quantum keys or a validity lifetime for each of the quantum keys.

15. The method of claim 14, wherein at least one of the classical links is one of an RS-232 cable or an Ethernet cable connected to a corresponding port of the communication device.

16. The method of claim 14, further comprising generating a new quantum key at least once for each message that is communicated through the network to or from one of the end devices.

17. The method of claim 14, wherein generating the quantum key includes emitting one or more photons that define the one or more quantum states into an optical fiber that defines the quantum channel.

18. The method of claim 14, wherein the end devices include a first end device connected to the communication device via a first classical link of the classical links, and a second end device connected to the communication device via a second classical link of the classical links, wherein transmitting the quantum keys comprises transmitting a first quantum key of the quantum keys from the communication device to the first end device via the first classical link, and transmitting a second quantum key of the quantum keys from the communication device to the second end device via the second classical link.

19. A communication system comprising:
a first quantum key distribution device coupled to a second quantum key distribution device over a quantum channel and to generate multiple quantum keys, each of the quantum keys generated based on one or more quantum states transmitted along the quantum channel;
a communication device coupled to the first quantum key distribution device via a classical connection cable; and
multiple end devices within a network connected to the communication device via classical links, wherein the communication device receives the quantum keys from the first quantum key distribution device and distributes the quantum keys to the end devices via the classical links to enable the end devices to use the quantum keys for at least one of encrypting or decrypting messages communicated through the network, wherein the communication device distributes the quantum keys by multicasting key information to the end devices via the classical links, the key information comprising the quantum keys and at least one of a device assignment for each of the quantum keys or a validity lifetime for each of the quantum keys.

20. The communication system of claim 1, wherein the key information comprises both the device assignment and the validity lifetime for each of the quantum keys.

21. The method of claim 14, wherein multicasting the key information includes multicasting both the device assignment and the validity lifetime for each of the quantum keys.

* * * * *